(12) United States Patent
Goto

(10) Patent No.: US 11,268,043 B2
(45) Date of Patent: *Mar. 8, 2022

(54) COMPOSITION, AND THREADED CONNECTION FOR PIPES OR TUBES INCLUDING LUBRICANT COATING LAYER FORMED FROM THE COMPOSITION

(71) Applicants: Nippon Steel Corporation, Tokyo (JP); Vallourec Oil and Gas France, Aulnoye-Aymeries (FR)

(72) Inventor: Kunio Goto, Tokyo (JP)

(73) Assignees: Nippon Steel Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/754,897

(22) PCT Filed: Oct. 12, 2018

(86) PCT No.: PCT/JP2018/038095
§ 371 (c)(1),
(2) Date: Apr. 9, 2020

(87) PCT Pub. No.: WO2019/074097
PCT Pub. Date: Apr. 18, 2019

(65) Prior Publication Data
US 2021/0198591 A1    Jul. 1, 2021

(30) Foreign Application Priority Data
Oct. 13, 2017    (JP) .............................. JP2017-199015

(51) Int. Cl.
    *C10M 169/00*     (2006.01)
    *C10M 101/02*     (2006.01)
    (Continued)

(52) U.S. Cl.
    CPC ...... *C10M 169/00* (2013.01); *C10M 101/025* (2013.01); *C10M 103/02* (2013.01);
    (Continued)

(58) Field of Classification Search
    CPC .............. C10M 103/02; C10M 107/38; C10M 125/10; C10M 145/04; C10M 145/20;
    (Continued)

(56) References Cited

U.S. PATENT DOCUMENTS 5,866,518 A    2/1999    Dellacorte et al.
8,753,417 B1    6/2014    DellaCorte et al.
(Continued)

FOREIGN PATENT DOCUMENTS

CA        3009607 A1    6/2017
JP        S62-209199 A    9/1987
(Continued)

OTHER PUBLICATIONS

English Abstract of WO-2009-057754.
English Abstract of WO-2014024755A1.

*Primary Examiner* — Vishal V Vasisth
(74) *Attorney, Agent, or Firm* — Banner & Witcoff, Ltd.

(57) ABSTRACT

The composition according to the present embodiment is a composition for forming a lubricant coating layer on a threaded connection for pipes or tubes, and contains $Cr_2O_3$, a metal soap, a wax and a basic metal salt of an aromatic organic acid. The threaded connection for pipes or tubes according to the present embodiment includes a pin and a box. The pin and the box each include a contact surface including a threaded portion. The threaded connection for pipes or tubes includes, as an outermost layer, a lubricant coating layer formed from the aforementioned composition on at least one of the contact surfaces of the pin and the box.

20 Claims, 7 Drawing Sheets

(51) Int. Cl.

| | | |
|---|---|---|
| *C10M 103/02* | (2006.01) | |
| *C10M 107/38* | (2006.01) | |
| *C10M 111/00* | (2006.01) | |
| *C10M 111/04* | (2006.01) | |
| *C10M 117/02* | (2006.01) | |
| *C10M 125/10* | (2006.01) | |
| *C10M 129/50* | (2006.01) | |
| *C10M 129/54* | (2006.01) | |
| *C10M 135/10* | (2006.01) | |
| *C10M 141/02* | (2006.01) | |
| *C10M 141/08* | (2006.01) | |
| *F16L 15/00* | (2006.01) | |
| *C10N 40/34* | (2006.01) | |
| *C10N 50/08* | (2006.01) | |

(52) U.S. Cl.
CPC .......... *C10M 107/38* (2013.01); *C10M 111/00* (2013.01); *C10M 111/04* (2013.01); *C10M 117/02* (2013.01); *C10M 125/10* (2013.01); *C10M 129/50* (2013.01); *C10M 129/54* (2013.01); *C10M 135/10* (2013.01); *C10M 141/02* (2013.01); *C10M 141/08* (2013.01); *F16L 15/006* (2013.01); *C10M 2201/0413* (2013.01); *C10M 2201/086* (2013.01); *C10M 2203/1025* (2013.01); *C10M 2207/1265* (2013.01); *C10M 2207/141* (2013.01); *C10M 2207/144* (2013.01); *C10M 2213/0623* (2013.01); *C10M 2219/044* (2013.01); *C10N 2040/34* (2013.01); *C10N 2050/08* (2013.01); *F16L 2201/20* (2013.01)

(58) Field of Classification Search
CPC .......... C10M 149/18; C10M 2201/086; C10N 2010/12; C10N 2050/15; C23C 28/00; C23C 28/021; F16L 15/00; F16L 15/001; F16L 15/04; F16L 58/182
See application file for complete search history.

(56) References Cited

U.S. PATENT DOCUMENTS

| | | | |
|---|---|---|---|
| 2008/0257461 A1* | 10/2008 | Son | C22C 38/06 148/651 |
| 2010/0242799 A1 | 9/2010 | Kim | |
| 2010/0264649 A1* | 10/2010 | Goto | F16L 15/08 285/333 |
| 2016/0130520 A1 | 5/2016 | Kong et al. | |

FOREIGN PATENT DOCUMENTS

| JP | 2017-115135 A | 6/2017 |
|---|---|---|
| WO | 2009057754 A1 | 5/2009 |
| WO | 2014024755 A1 | 2/2014 |

\* cited by examiner

COMPOSITION, AND THREADED CONNECTION FOR PIPES OR TUBES INCLUDING LUBRICANT COATING LAYER FORMED FROM THE COMPOSITION

This application is a 371 of PCT/JP2018/038095, filed Oct. 12, 2018.

TECHNICAL FIELD

The present invention relates to a composition, in particular a composition for forming a lubricant coating layer to be used in a threaded connection for oil country tubular goods, and also relates to a threaded connection for pipes or tubes that includes a lubricant coating layer formed from the composition.

BACKGROUND ART

Oil well pipes are used for drilling of oil fields and natural gas fields. Oil well pipes are formed by coupling a plurality of steel pipes in accordance with the depth of the well. Connection of steel pipes can be carried out by fastening threaded connection for pipes or tubes formed at ends of the two steel pipes. When trouble occurs during the course of operations until an oil well is completed or after completion of an oil well, oil country tubular goods may be repeatedly lifted and loosened to inspect the thread faces and the like thereof, and thereafter refastened and lowered for re-use.

The threaded connection for pipes or tubes includes a pin and a box. The pin includes a male threaded portion formed in the outer peripheral surface at the end of the pipe. The box includes a female threaded portion formed in the inner peripheral surface at the end of the pipe. The pin and the box may also include an unthreaded metal contact portion. The threaded portions and unthreaded metal contact portions of the pin and the box repeatedly experience strong friction during fastening and loosening of the pipes. If these portions are not sufficiently resistant to friction, galling (unrepairable seizure) will occur during repeated fastening and loosening. Thus, it is necessary that threaded connection for pipes or tubes have sufficient resistance to friction, i.e., excellent galling resistance.

Heretofore, heavy metal-containing compound greases, referred to as dopes, have been used to improve the galling resistance. Application of a compound grease to the surface of a threaded connection for pipes or tubes can improve the galling resistance of the threaded connection for pipes or tubes. However, heavy metals contained in compound greases, such as Pb, Zn, and Cu, may affect the environment. For this reason, the development of a composition for forming a lubricant coating layer to be used in a threaded connection for pipes or tubes which does not use a compound grease is desired.

International Application Publication No. WO2009/057754 (Patent Literature 1) and International Application Publication No. WO2014/024755 (Patent Literature 2) propose a lubricant coating layer excellent in galling resistance even without using a compound grease, and a composition for forming a lubricant coating layer.

The lubricant coating layer described in Patent Literature 1 includes one of or both of rosin and calcium fluoride, and a metal soap, a wax and a basic metal salt of an aromatic organic acid. It is described in Patent Literature 1 that, as a result, the lubricant coating layer is excellent in anti-galling, gas tightness and anti-rust properties.

A composition for forming a lubricant coating layer on a tube-like threaded connection described in Patent Literature 2 contains melamine cyanurate and a basic metal salt of an aromatic organic acid, and one or more types selected from the group consisting of a pine resin-based material, a wax, a metal soap and a lubricant powder. It is described in Patent Literature 2 that, as a result, the obtained lubricant coating layer is excellent in anti-galling, gas tightness and anti-rust properties.

CITATION LIST

Patent Literature

Patent Literature 1: International Application Publication No. WO2009/057754
Patent Literature 2: International Application Publication No. WO2014/024755

SUMMARY OF INVENTION

Technical Problem

In this connection, the threaded portions and unthreaded metal contact portions of the pin and box include metal seal portions and shoulder portions. During fastening of a threaded connection for pipes or tubes that has an unthreaded metal contact portion, the shoulder portions of the pin and box come in contact with each other. Torque that arises at that time is called "shouldering torque". During fastening of a threaded connection for pipes or tubes, after the shouldering torque is reached, fastening is continued until fastening is completed. By this means, the gas tightness of the threaded connection for pipes or tubes is enhanced. If fastening proceeds further, metal constituting at least one of the pin and the box starts to undergo a plastic deformation. The torque at such time is referred to as "yield torque".

The torque when fastening is completed (hereunder, referred to as "fastening torque") is set so that a sufficient seal interfacial pressure is obtained irrespective of the size of the thread interference amount. If there is a sufficient difference between the shouldering torque and the yield torque (hereunder, this difference is referred to as "torque on shoulder resistance $\Delta T$▫"), the range of the fastening torque widens. As a result, the fastening torque is adjusted easily. Therefore, it is necessary that a threaded connection for pipes or tubes has both the aforementioned galling resistance and a high torque on shoulder resistance $\Delta T$▫ that is, high over-torque performance. This similarly applies with respect to a threaded connection for pipes or tubes which does not have an unthreaded metal contact portion (particularly, a shoulder portion). Even when a threaded connection for pipes or tubes does not have a shoulder portion, if high torque is maintained at a time of high interfacial pressure, it will be easy to adjust the fastening torque.

An objective of the present invention is to provide a composition for obtaining a threaded connection for pipes or tubes having excellent galling resistance and high over-torque performance, and also a threaded connection for pipes or tubes which includes a lubricant coating layer formed from the composition and which has excellent galling resistance and high over-torque performance.

Solution to Problem

The composition according to the present embodiment is a composition for forming a lubricant coating layer on a threaded connection for pipes or tubes, the composition containing $Cr_2O_3$, a metal soap, a wax and a basic metal salt of an aromatic organic acid.

The threaded connection for pipes or tubes according to the present embodiment is a threaded connection that is for pipes or tubes and that includes a pin and a box. The pin and the box each include a contact surface that includes a threaded portion. The threaded connection for pipes or tubes includes, as an outermost layer, a lubricant coating layer that is formed from the aforementioned composition on at least one of the contact surfaces of the pin and the box.

Advantageous Effects of Invention

A threaded connection for pipes or tubes according to the present embodiment includes a lubricant coating layer. A composition for forming the aforementioned lubricant coating layer contains $Cr_2O_3$. Therefore, the threaded connection for pipes or tubes according to the present embodiment exhibits excellent galling resistance even when fastening is repeated. In addition, the threaded connection for pipes or tubes according to the present embodiment exhibits high over-torque performance.

DESCRIPTION OF EMBODIMENTS

The present embodiment will be described in detail below with reference to the drawings. The same reference symbols will be used throughout the drawings to refer to the same or like parts, and description thereof will not be repeated.

The present inventors conducted various studies regarding the relation between a composition for forming a lubricant coating layer for a threaded connection for pipes or tubes, a threaded connection for pipes or tubes, and galling resistance and over-torque performance. As a result, the present inventors obtained the following findings.

[Over-Torque Performance]

Figure 1:
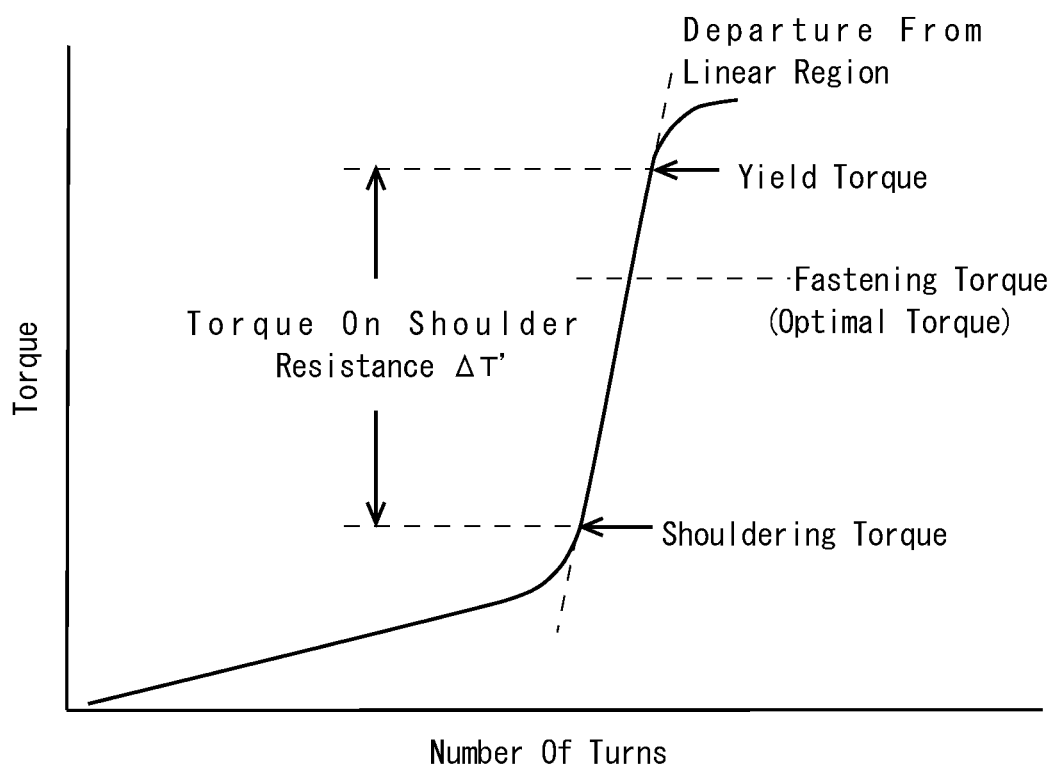
FIG. 1 is a graph illustrating the relation between the number of turns of a threaded connection for pipes or tubes that has a shoulder portion and the torque.

During fastening of steel pipes to each other, the optimal torque to end the fastening is determined in advance. FIG. 1 is a graph illustrating the relation between the number of turns of threaded connections for pipes or tubes and the torque during fastening of threaded connections for pipes or tubes that have a shoulder portion. Referring to FIG. 1, fastening of the threaded connections for pipes or tubes initially increases the torque in proportion to the number of turns. The rate of increase in the torque at such time is low. As fastening continues, the shoulder portions come in contact with each other. The torque at such time is referred to as "shouldering torque". After the shouldering torque is reached, when fastening is continued, the torque again increases in proportion to the number of turns. The rate of increase in the torque at such time is high. The fastening is completed at a time point at which the torque reaches a predetermined numerical value (fastening torque). If the torque during fastening reaches the fastening torque, the metal seal portions interfere with each other with an appropriate interfacial pressure. In this case, the gas tightness of the threaded connections for pipes or tubes increases.

If fastening is further continued after the fastening torque is reached, the torque becomes too high. If the torque becomes too high, a part of the pin and the box undergoes a plastic deformation. The torque at such time is referred to as "yield torque". When the torque on shoulder resistance $\Delta T\square$ which is the difference between the shouldering torque and the yield torque is large, a margin can be provided with respect to the range of the fastening torque. As a result, it is easy to adjust the fastening torque. Therefore, a higher value for the torque on shoulder resistance $\Delta T\square$ is preferable. In the present description, the term "over-torque performance is high" means the torque on shoulder resistance $\Delta T\square$ is high.

In order to raise the torque on shoulder resistance $\Delta T\square$ it is effective to decrease the shouldering torque or to increase the yield torque. Therefore, it is considered that causing hard particles to be contained in a composition for forming a lubricant coating layer (hereinafter, also referred to simply as "composition") will increase the yield torque at a time of high interfacial pressure. As a result, it is considered that the torque on shoulder resistance $\Delta T\square$ will increase.

However, as the result of investigations and studies conducted by the present inventors, the present inventors found that even though hard particles were simply contained in a composition, a high torque on shoulder resistance $\Delta T\square$ was not obtained. For example, although $CaF_2$ is a hard particle, as shown in an example described later, a high torque on shoulder resistance $\Delta T\square$ could not be obtained when using $CaF_2$.

Therefore, the present inventors conducted further studies of various kinds and discovered that a high torque on shoulder resistance $\Delta T\square$ is obtained by containing $Cr_2O_3$ in a composition.

Figure 2:
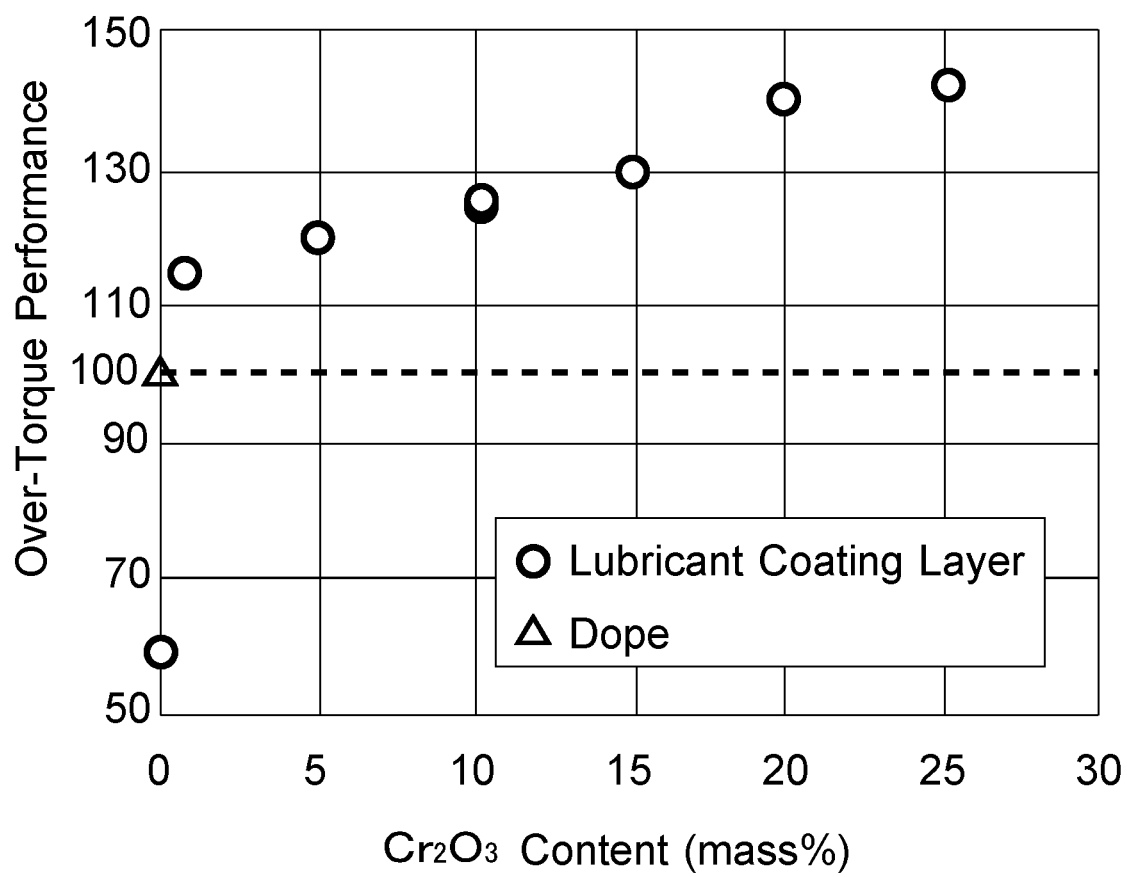
FIG. 2 is a graph illustrating the relation between the $Cr_2O_3$ content in a composition for forming a lubricant coating layer and over-torque performance.

FIG. 2 is a graph illustrating the relation between the $Cr_2O_3$ content in a composition and over-torque performance. FIG. 2 was obtained by means of an example that is described later. Note that, the over-torque performance was determined as a relative value with respect to the torque on shoulder resistance $\Delta T\square$ of Test No. 8 where a dope according to the API (American Petroleum Institute) standards is used instead of a lubricant coating layer is taken as a reference (100). The symbol of white circle "○" in FIG. 2 denotes the over-torque performance for an example in which a lubricant coating layer was formed. The symbol of white triangle "Δ" in FIG. 2 denotes the over-torque performance when the dope according to the API standards was used instead of a lubricant coating layer.

Based on FIG. 2, it is shown that when $Cr_2O_3$ is contained, the over-torque performance is more than 100. In other words, when $Cr_2O_3$ is contained, high over-torque performance is obtained.

[Galling Resistance]

The present inventors further discovered that, by causing a suitable amount of $Cr_2O_3$ to be contained in the composition, the galling resistance also increases, and not just the over-torque performance.

Figure 3:
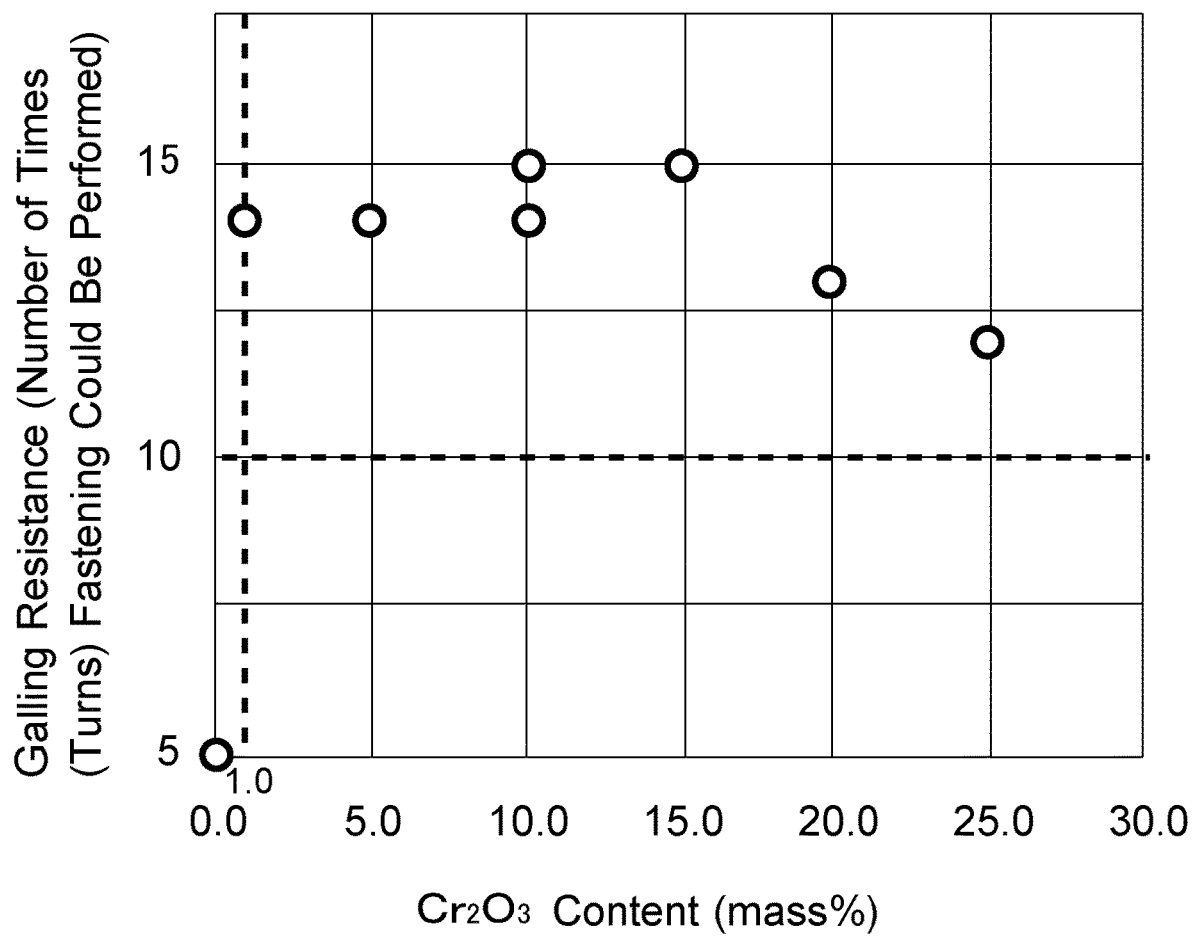
FIG. 3 is a graph illustrating the relation between the $Cr_2O_3$ content in a composition for forming a lubricant coating layer and galling resistance.

FIG. 3 is a graph illustrating the relation between the $Cr_2O_3$ content in a composition and the galling resistance. FIG. 3 was obtained by means of an example described later. The ordinate in FIG. 3 represents the number of times of fastening completed without the occurrence of either of unrepairable galling at a threaded portion and galling at a metal seal portion.

FIG. 3 shows that, when a suitable amount of $Cr_2O_3$ is contained in the composition, the number of times fastening can be performed is more than 10 times. In other words, when a suitable amount of $Cr_2O_3$ is contained in the composition, high galling resistance is obtained.

A composition according to the present embodiment completed based on the above findings is a composition for forming a lubricant coating layer in a threaded connection for pipes or tubes, the composition containing $Cr_2O_3$, a metal soap, a wax and a basic metal salt of an aromatic organic acid.

In the composition according to the present embodiment, in mass percent based on the total amount of non-volatile components, preferably the $Cr_2O_3$ content is from 1 to 20%, the metal soap content is from 2 to 30%, the wax content is from 2 to 30%, and the basic metal salt of the aromatic organic acid content is from 20 to 70%.

In this case, the over-torque performance and galling resistance further increase.

The composition according to the present embodiment may also contain a lubricant powder.

In a case where the composition according to the present embodiment contains a lubricant powder, in mass percent based on the total amount of non-volatile components, the lubricant powder content is preferably from 0.5 to 20%.

Preferably, the aforementioned lubricant powder is one or more types selected from a group consisting of graphite and polytetrafluoroethylene.

The composition according to the present embodiment may also contain a volatile organic solvent.

A threaded connection for pipes or tubes according to the present embodiment is a threaded connection that is for pipes or tubes and that includes a pin and a box. The pin and the box each include a contact surface that includes a threaded portion. The threaded connection for pipes or tubes includes, as an outermost layer, a lubricant coating layer that is formed from the aforementioned composition on at least one of the contact surfaces of the pin and the box.

The threaded connection for pipes or tubes according to the present embodiment may include a metal plating layer between at least one of the contact surfaces of the pin and the box, and the lubricant coating layer.

The threaded connection for pipes or tubes according to the present embodiment may include, below the lubricant coating layer, a chemical conversion treatment coating having a surface that contacts the lubricant coating layer.

In the threaded connection for pipes or tubes according to the present embodiment, a surface that contacts the lubricant coating layer may be subjected to a blasting treatment. Further, in the threaded connection for pipes or tubes according to the present embodiment, a surface that contacts the lubricant coating layer may be subjected to pickling.

In the threaded connection for pipes or tubes according to the present embodiment, the contact surface may further include an unthreaded metal contact portion.

Hereunder, the composition, and the threaded connection for pipes or tubes including a lubricant coating layer formed from the composition according to the present embodiment will be described in detail.

[Threaded Connection 1 for Pipes or Tubes]

Figure 4:
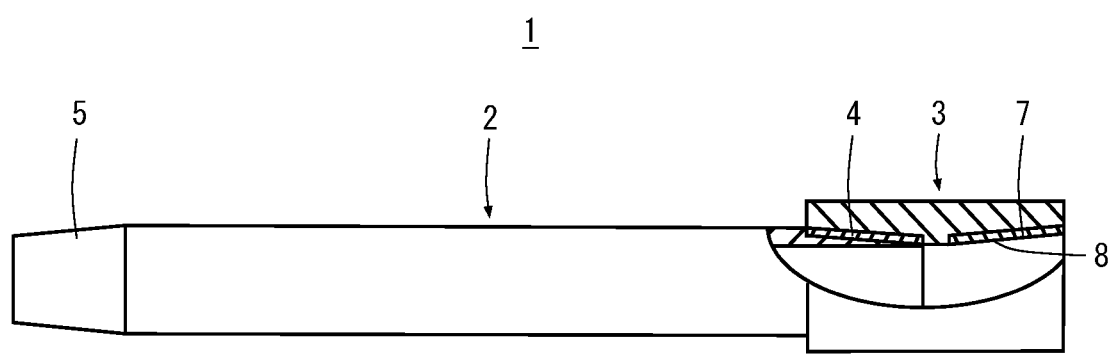
FIG. 4 is a diagram illustrating a configuration of a threaded connection for pipes or tubes according to the present embodiment.

The threaded connection 1 for pipes or tubes includes a pin 5 and a box 8. FIG. 4 is a diagram illustrating a configuration of the threaded connection for pipes or tubes according to the present embodiment. A threaded connection 1 for pipes or tubes includes a steel pipe 2 and a coupling 3. The pin 5 is formed at each end of the steel pipe 2 and the pin 5 includes a male threaded portion 4 in its outer surface. The box 8 is formed at each end of the coupling 3 and the box 8 includes a female threaded portion 7 in its inner surface. By fastening the pin 5 and box 8 together, the coupling 3 is attached to the end of the steel pipe 2. Although not illustrated in the drawings, a pin 5 of the steel pipe 2 and a box 8 of the coupling 3 that are not coupled to a mating member may have a protector (not illustrated) attached thereto for protecting their threaded portions.

A typical threaded connection 1 for pipes or tubes is of the coupling type like the one illustrated in FIG. 4, which includes the steel pipe 2 and the coupling 3. Also known is a threaded connection 1 for pipes or tubes of the integral type, in which one end of a steel pipe 2 is in the form of a pin 5 and the other end thereof is in the form of a box 8, with no coupling used. The threaded connection 1 for pipes or tubes of the present embodiment may be employed either as a coupling type threaded connection or as an integral type threaded connection.

Figure 5:
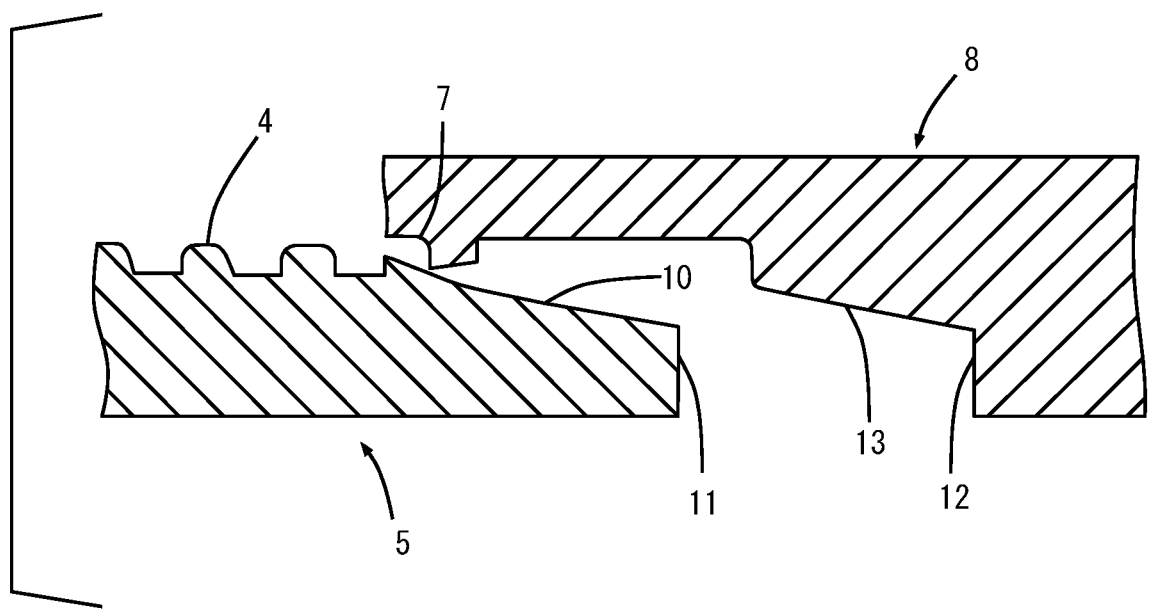
FIG. 5 is a cross-sectional view of the threaded connection for pipes or tubes according to the present embodiment.

The pin 5 and the box 8 include a contact surface that includes a threaded portion and an unthreaded metal contact portion. FIG. 5 is a cross-sectional view of the threaded connection 1 for pipes or tubes according to the present embodiment. The pin 5 includes the male threaded portion 4 and the unthreaded metal contact portion. The unthreaded metal contact portion of the pin 5 is formed at the tip end of the pin 5 and includes a metal seal portion 10 and a shoulder portion 11. The box 8 includes the female threaded portion 7 and the metal contact portion. The unthreaded metal contact portion of the box 8 is formed at the tip end of the box 8 and includes a metal seal portion 13 and a shoulder portion 12. The portion at which the pin 5 and the box 8 come into contact with each other when they are fastened together is referred to as the contact surface. Specifically, when the pin 5 and the box 8 have been fastened to each other, the two shoulder portions (shoulder portions 11 and 12) come into contact with each other, and so do the two metal seal portions (metal seal portions 10 and 13) and the two threaded portions (male threaded portion 4 and female threaded portion 7). That is, the contact surface includes the shoulder portion, the metal seal portion and the threaded portion.

Although not illustrated in the drawings, in some cases a contact surface of the threaded connection 1 for pipes or tubes may not have an unthreaded metal contact portion. In such a case, the contact surface of the threaded connection 1 for pipes or tubes includes a threaded portion. Specifically, the pin 5 includes the male threaded portion 4. The box 8 includes the female threaded portion 7.

[Lubricant Coating Layer 21]

Figure 6:
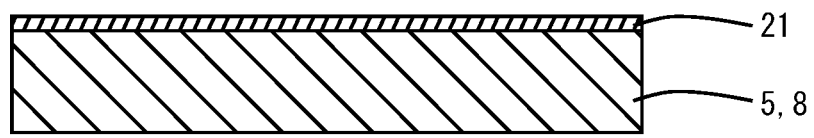
FIG. 6 is a cross-sectional view of a contact surface of the threaded connection for pipes or tubes according to the present embodiment.

In the threaded connection 1 for pipes or tubes, at least one of the pin 5 and box 8 includes a lubricant coating layer 21 on its contact surface. FIG. 6 is a cross-sectional view of a contact surface of the threaded connection 1 for pipes or tubes according to the present embodiment. A lubricant coating layer 21 is formed by, as described in a production method that is mentioned later, applying a composition for forming the lubricant coating layer 21 to at least one of the contact surfaces of the pin 5 and the box 8, and drying the composition.

[Composition for Forming Lubricant Coating Layer 21]

The composition for forming the lubricant coating layer 21 contains $Cr_2O_3$, a metal soap, a wax and a basic metal salt of an aromatic organic acid. Therefore, the lubricant coating layer 21 also contains $Cr_2O_3$, a metal soap, a wax and a basic metal salt of an aromatic organic acid. The composition may either be a composition of a solventless type (i.e., including the above-described components only) or be a composition of a solvent type in which the components are dissolved in a solvent. In the case of a composition of a solvent type, the mass percentage of each component refers to a mass percentage of the component relative to the total amount of non-volatile components in the composition (the total mass of all components excluding the solvent contained in the composition) as being 100%. That is, the content of each component in the composition and the content of each component in the lubricant coating layer 21 are equal to each other.

Hereunder, each component in the composition will be described in detail. Unless specifically stated otherwise, the symbol "%" in relation to each component means "mass percent based on a total amount of non-volatile components in the composition". In the present embodiment the term "non-volatile components" means all components other than a solvent that are contained in the composition. The term "non-volatile components" refers to, for example, $Cr_2O_3$, a metal soap, a wax and a basic metal salt of an aromatic organic acid. The respective components can each be independently selected, and a selected combination does not produce any new effect.

[$Cr_2O_3$]

$Cr_2O_3$ is also referred to as "chromium oxide (III)". $Cr_2O_3$ is an inorganic compound. The formula weight of $Cr_2O_3$ is 151.99. $Cr_2O_3$ is obtained by thermal decomposition of ammonium dichromate (ammonium bichromate). $Cr_2O_3$ becomes a dark-green crystal with a metallic luster by sublimation and purification. $Cr_2O_3$ is very stable, and is harder than quartz. $Cr_2O_3$ does not have toxicity and is not hazardous.

As described above, if $Cr_2O_3$ is contained in the composition, the over-torque performance increases. Further, if $Cr_2O_3$ is contained in the composition, the galling resistance also increases.

The $Cr_2O_3$ content in the lubricant coating layer 21 is preferably from 1 to 20% in mass percent based on the total amount of non-volatile components in the composition. When the $Cr_2O_3$ content is 1% or more, sufficient over-torque performance is obtained. When the $Cr_2O_3$ content is not more than 20%, a decline in the strength of the coating can be suppressed. Furthermore, if the $Cr_2O_3$ content is not more than 20%, an increase in friction is suppressed, and high galling resistance can be maintained. The lower limit of the $Cr_2O_3$ content is more preferably 5 mass %, further preferably is 7 mass %, and further preferably is 10 mass %. The upper limit of the $Cr_2O_3$ content is more preferably 18 mass %, and further preferably is 15 mass %.

$Cr_2O_3$, for example, is a dark green particle. A preferable particle size of $Cr_2O_3$ is 45 μm or less. From the viewpoint of uniform dispersibility, a particle size of 10 μm or less is more preferable. The particle size is the arithmetic mean value of an effective particle size distribution obtained by particle size distribution measurement performed by a laser diffraction and scattering method (for example, using the SALD series manufactured by SHIMADZU).

The $Cr_2O_3$ is, for example, chromium oxide (III) manufactured by Wako Pure Chemical Industries, Ltd.

[Metal Soap]

A metal soap is a salt of a fatty acid with a metal other than an alkali metal. By containing a metal soap, the galling resistance and anti-rust properties of the lubricant coating layer 21 improve.

From the viewpoint of lubricity and anti-rust properties, it is preferable that the fatty acid of the metal soap be a fatty acid having 12 to 30 carbon atoms. The fatty acid may be either a saturated fatty acid or an unsaturated fatty acid. The fatty acid is a mixed fatty acid or a single compound. The mixed fatty acid, for example, is derived from natural fat and oil such as beef tallow, lard, wool fat, palm oil, rapeseed oil, and coconut oil. The fatty acid that is a single compound is, for example, lauric acid, tridecylic acid, myristic acid, palmitic acid, lanopalmitic acid, stearic acid, isostearic acid, oleic acid, elaidic acid, arachic acid, behenic acid, erucic acid, lignoceric acid, lanoceric acid, sulfonic acid, salicylic acid, and carboxylic acid.

Examples of the metal of the metal soap include calcium, alkaline earth metals and zinc. A calcium salt is preferable as the type of metal salt. The salt may be either a neutral salt or a basic salt.

That is, the metal soap includes, for example, a salt of one or more types of fatty acid selected from a group consisting of beef tallow, lard, wool fat, palm oil, rapeseed oil, coconut oil, lauric acid, tridecylic acid, myristic acid, palmitic acid, lanopalmitic acid, stearic acid, isostearic acid, oleic acid, elaidic acid, arachic acid, behenic acid, erucic acid, lignoceric acid, lanoceric acid, sulfonic acid, salicylic acid and carboxylic acid with one or more types of metal selected from a group consisting of calcium, alkaline earth metals and zinc.

The content of the metal soap in the composition is preferably from 2 to 30% in mass percent based on the total amount of non-volatile components in the composition. When the content of the metal soap is 2% or more, the galling resistance and anti-rust properties of the lubricant coating layer 21 can be sufficiently enhanced. When the content is not more than 30%, the necessary adhesion properties and strength of the lubricant coating layer 21 are sufficiently obtained. A further preferable lower limit of the content of the metal soap is 4%, and more preferably is 10%. A further preferable upper limit of the content of the metal soap is 19%, and more preferably is 17%.

[Wax]

The term "wax" refers to an organic substance which is solid at normal temperature and becomes liquid when heated. The wax is one or more types selected from a group consisting of animal wax, vegetable wax, mineral wax, and synthetic wax. Examples of the animal wax include beeswax and spermaceti wax. Examples of the vegetable wax include Japan wax, carnauba wax, candelilla wax and rice wax. Examples of the mineral wax include paraffin wax, microcrystalline wax, petrolatum, montan wax, ozocerite and ceresin. Examples of the synthetic wax include oxidized wax, polyethylene wax, Fischer-Tropsch wax, amide wax and hydrogenated castor oil (castor wax). Preferably, the wax is paraffin wax having a molecular weight of 150 to 500.

That is, the wax is, for example, one or more types of wax selected from a group consisting of beeswax, spermaceti wax, Japan wax, carnauba wax, candelilla wax, rice wax, paraffin wax, microcrystalline wax, petrolatum, montan wax, ozocerite, ceresin, oxidized wax, polyethylene wax, Fischer-Tropsch wax, amide wax and hydrogenated castor oil (castor wax).

Preferably, the wax is one or more types of wax selected from a group consisting of paraffin wax, microcrystalline wax and oxidized wax.

The wax reduces the friction and increases the galling resistance of the lubricant coating layer 21. The wax also reduces the flowability of the lubricant coating layer 21, and increases the strength of the lubricant coating layer 21.

The content of the wax in the composition is preferably from 2 to 30% in mass percent based on the total amount of non-volatile components in the composition. When the wax content is 2% or more, the aforementioned effects can be sufficiently obtained. When the content is not more than 30%, the necessary adhesion properties and strength of the lubricant coating layer 21 are sufficiently obtained. A further preferable lower limit of the wax content is 5%, and more preferably is 10%. A further preferable upper limit of the wax content is 20%, and more preferably is 15%.

[Basic Metal Salt of Aromatic Organic Acid]

The basic metal salt of an aromatic organic acid is a salt constituted by an aromatic organic acid and a surplus alkali (alkali metal or alkaline earth metal). The basic metal salt of an aromatic organic acid, for example, is a substance which is present in a grease form or semisolid form at normal temperature. In the basic metal salt of an aromatic organic acid, a surplus content of alkali is dispersed in oil as a metal salt of colloidal fine particles.

An anticorrosion property of the composition is significantly increased by containing a basic metal salt of an aromatic organic acid therein. In addition, by containing a basic metal salt of an aromatic organic acid, the galling resistance of the lubricant coating layer 21 also increases. The reason these effects are obtained is that, because the basic metal salt of an aromatic organic acid is present in a colloidal fine particle state, surplus metal salts are physically adsorbed, or chemically adsorbed by organic acid groups.

Examples of the metal salt of an aromatic organic acid include basic sulfonates, basic salicylates, basic phenates and basic carboxylates.

The alkali that constitutes a cation portion of the basic metal salt of an aromatic organic acid is, for example, one or more types of alkali selected from a group consisting of alkali metals and alkaline earth metals. The alkali is preferably an alkaline earth metal, and further preferably is one or more types selected from a group consisting of calcium, barium and magnesium.

That is, the basic metal salt of an aromatic organic acid is, for example, one or more types of metal salt selected from a group consisting of basic sodium sulfonate, basic potassium sulfonate, basic magnesium sulfonate, basic calcium sulfonate, basic barium sulfonate, basic sodium salicylate, basic potassium salicylate, basic magnesium salicylate, basic calcium salicylate, basic barium salicylate, basic sodium phenate, basic potassium phenate, basic magnesium phenate, basic calcium phenate, basic barium phenate, basic sodium carboxylate, basic potassium carboxylate, basic magnesium carboxylate, basic calcium carboxylate and basic barium carboxylate.

The higher that a base number of the basic metal salt of an aromatic organic acid is, the more that an amount of fine particle metal salts which function as a solid lubricant increases. As a result, the galling resistance of the lubricant coating layer 21 increases. Further, when the base number is higher than a certain level, there is an action that neutralizes an acid component. As a result, an anti-rust power of the lubricant coating also increases. Therefore, the basic metal salt of an aromatic organic acid preferably has a base number (JIS K2501) (in a case of using two or more types, a weighted average value of base numbers for which an amount is taken into consideration) of 50 to 500 mg KOH/g. When the base number is 50 mg KOH/g or more, the aforementioned effects are sufficiently obtained. When the base number is not more than 500 mg KOH/g, hydrophilicity can be decreased and sufficient anti-rust properties are obtained. A further preferable lower limit of the base number of the basic metal salt of an aromatic organic acid is 100 mg KOH/g, and more preferably is 200 mg KOH/g, and further preferably is 250 mg KOH/g. A further preferable upper limit of the base number of the basic metal salt of an aromatic organic acid is 450 mg KOH/g.

As described above, the basic metal salt of an aromatic organic acid is a substance in a grease form or semisolid form, and can also serve as a base of the lubricant coating layer 21. Therefore, the basic metal salt of an aromatic organic acid can be contained in a large amount of up to 70% in mass percent based on the total amount of non-volatile components in the composition. The lower limit of the content of the basic metal salt of an aromatic organic acid is, in mass percent based on the total amount of non-volatile components in the composition, preferably 20%, and more preferably is 40%. The upper limit of the content of the basic metal salt of an aromatic organic acid is preferably 70%.

[Lubricant Powder]

The composition may contain a lubricant powder in order to further increase the lubricity of the lubricant coating layer 21. The term "lubricant powder" generically refers to additives having lubricity. A powder that is known in the art can be used as the lubricant powder.

A lubricant powder can be categorized into, for example, the following four types. The lubricant powder includes at least one type selected from the group consisting of the following (1) to (4):

(1) Lubricant powders having a particular crystal structure, such as a lamellar hexagonal crystal structure, in which a slip easily occurs and which thereby exhibits lubricity (e.g., graphite, zinc oxide, and boron nitride);

(2) Lubricant powders including a reactive element in addition to a particular crystal structure and thereby exhibiting lubricity (e.g., molybdenum disulfide, tungsten disulfide, graphite fluoride, tin sulfide, and bismuth sulfide);

(3) Lubricant powders exhibiting lubricity due to chemical reactivity (e.g., thiosulfate compounds); and (4) Lubricant powders exhibiting lubricity due to plastic or viscoplastic behavior under frictional stresses (e.g., polytetrafluoroethylene (PTFE) and polyamide).

Any of the lubricant powders described in (1) to (4) above can be used. Therefore, the lubricant powder is, for example, one or more types selected from a group consisting of graphite, zinc oxide, boron nitride, molybdenum disulfide, tungsten disulfide, graphite fluoride, tin sulfide, bismuth sulfide, thiosulfate compounds, polytetrafluoroethylene (PTFE) and polyamide.

One of the lubricant powders described in (1) to (4) above may be used alone. For example, a lubricant powder described in (1) may be used alone. Two or more of the lubricant powders described in (1) to (4) above may be used in combination. For example, a lubricant powder described in (4) may be used in combination with a lubricant powder described in (1) above.

Preferably, the lubricant powder contains one or more types selected from the group consisting of the aforementioned (1) and (4). Among the lubricant powders (1), graphite is preferred from the standpoint of adhesion properties and anti-rust properties of the lubricant coating layer 21 or earthy graphite is preferred from the standpoint of film forming properties. Among the lubricant powder (4), polytetrafluoroethylene (PTFE) is preferred.

Further preferably, the lubricant powder is polytetrafluoroethylene (PTFE).

The content of the lubricant powder in the composition is preferably in the range of 0.5 to 20% in mass percent based on the total amount of non-volatile components in the composition. When the content of the lubricant powder is not less than 0.5%, the galling resistance is further enhanced. This increases the number of operations of fastening and loosening that can be performed before galling occurs. On the other hand, if the content of the lubricant additive is not more than 20%, the strength of the lubricant coating layer 21 increases further. As a result, wear of the lubricant coating layer 21 is inhibited. The upper limit of the content of the lubricant powder is more preferably 15%, and further preferably is 10%.

[Volatile Organic Solvent]

The composition may contain a volatile organic solvent. In a case of performing the application at normal temperature, the composition is prepared by adding a volatile organic solvent to the mixture of the components of the composition of the lubricant coating layer 21. The volatile organic solvent is different from a base oil of the lubricating oil, and evaporates during a lubricant coating layer formation step. Therefore, the volatile organic solvent substantially does not remain in the lubricant coating. The term "volatile" means that there is a tendency for the organic solvent to evaporate in a coating state at a temperature in the range of room temperature to 150° C. However, the lubricant coating layer 21 of the present embodiment may be a viscous liquid or semisolid, and hence it is acceptable for a certain amount of solvent to remain.

The type of the volatile organic solvent is not particularly limited. For example, the volatile organic solvent is a petroleum solvent. The petroleum solvent is, for example, one or more types of solvent selected from a group consisting of a solvent corresponding to industrial gasoline defined by JIS K 2201, mineral sprit, aromatic petroleum naphtha, xylene, and Cellosolve.

A volatile organic solvent having a flash point of 30° C. or higher, an initial boiling point of 150° C. or higher, and an end point of not more than 210° C. is preferable from the viewpoint that it is relatively easy to handle, and also evaporates rapidly, and thus the drying time is short.

The proportion of the volatile organic solvent may be adjusted to an appropriate viscosity according to the application method. The content of the volatile organic solvent is, for example, 20 to 50 parts when taking the total amount of non-volatile components as 100 parts.

[Other Components]

The composition may also contain an anti-rust additive, an antiseptic agent and a coloring pigment or the like that are known in the art.

[Anti-Rust Additive]

The lubricant coating layer 21 needs to have anti-rust properties that can be maintained for a long period of time before being actually used. For this reason, the composition may include an anti-rust additive. The anti-rust additive generically refers to additives having corrosion resistance properties. The anti-rust additive includes, for example, one or more additives selected from the group consisting of aluminum tripolyphosphate, aluminum phosphite, and calcium ion-exchanged silica. Preferably, the anti-rust additive includes at least one selected from the group consisting of calcium ion-exchanged silica and aluminum phosphite. Other examples of the anti-rust additives that may be employed include a commercially available reactive water repellent agent.

The content of the anti-rust additive in the composition is preferably in the range of 2 to 10% in mass percent based on the total amount of non-volatile components in the composition. When the content of the anti-rust additive is not less than 2%, the lubricant coating layer 21 further exhibits consistently high anti-rust properties. On the other hand, when the content of the anti-rust additive is not greater than 10%, the lubricant coating layer 21 exhibits consistently high lubricity. If the content of the anti-rust additive is greater than 10%, the anti-rust effect will reach saturation.

[Antiseptic Agent]

The composition may further contain an antiseptic agent. The antiseptic agent also generically refers to additives having corrosion resistance properties.

By mixing together the aforementioned $Cr_2O_3$, metal soap, wax, basic metal salt of an aromatic organic acid and other components, the threaded connection 1 for pipes or tubes of the present embodiment that has the lubricant coating layer 21 can be produced.

[Metal Plating Layer]

The threaded connection 1 for pipes or tubes of the present embodiment may further include a metal plating layer between at least one of the contact surfaces of the pin 5 and the box 8, and the lubricant coating layer 21. The metal plating layer is, for example, a single-layer plating layer formed of Cu, Sn or Ni metal, a single-layer plating layer formed of a Cu—Sn alloy, a two-layer plating layer formed of a Cu layer and an Sn layer, or a three-layer plating layer formed of an Ni layer, a Cu layer and an Sn layer.

The hardness of the metal plating layer is preferably a micro-Vickers hardness of 300 or more. If the hardness of the metal plating layer is 300 or more, the threaded connection 1 for pipes or tubes exhibits consistently high corrosion resistance.

The hardness of the metal plating layer can be measured as follows. Five arbitrary regions are selected in the metal plating layer of the obtained threaded connection 1 for pipes or tubes. The Vickers hardness (HV) in each of the selected regions is measured in accordance with JIS Z 2244 (2009). The test conditions are, a test temperature of normal temperature (25° C.) and a test force of 2.94 N (300 gf). The mean of the obtained values (from a total of 5 places) is defined as the hardness of the metal plating layer.

In the case of multi-layer plating treatments, the thickness of the lowermost plating layer is preferably less than 1 μm. The thickness of the plating layer (total thickness of plating layers in the case of multi-layer plating) is preferably in the range of 5 to 15 μm.

The thickness of the metal plating layer is measured as follows. A probe of an eddy current phase-type film thickness measuring instrument conforming to ISO (International Organization for Standardization) 21968 (2005) is brought into contact with the contact surface on which the metal plating layer is formed. A phase difference between a high-frequency magnetic field on the input side of the probe and an eddy current on the metal plating layer that was excited by the high-frequency magnetic field is measured. The phase difference is converted into a thickness of the metal plating layer.

[Chemical Conversion Treatment Coating]

The threaded connection 1 for pipes or tubes of the present embodiment may further include, below the lubricant coating layer 21, a chemical conversion treatment coating having a surface that contacts the lubricant coating layer 21. Examples of the chemical conversion treatment coating include an oxalate chemical conversion treatment coating and a borate chemical conversion treatment coating.

The chemical conversion treatment coating is porous. Thus, when the lubricant coating layer 21 is formed on the chemical conversion treatment coating, the so-called "anchoring effect" is produced and, as a result, the lubricant coating layer 21 exhibits further increased adhesion properties. The thickness of the chemical conversion treatment coating is preferably in the range of 5 to 40 μm. When the thickness of the chemical conversion treatment coating is not less than 5 μm, sufficient corrosion resistance can be ensured. When the thickness of the chemical conversion treatment coating is not greater than 40 μm, the lubricant coating layer 21 exhibits consistently high adhesion properties.

[Surface Subjected to Blasting Treatment or Surface Subjected to Pickling]

In the threaded connection 1 for pipes or tubes of the present embodiment, a surface that contacts the lubricant coating layer 21 may be a surface that was subjected to a blasting treatment or pickling.

A surface that was subjected to a blasting treatment or a surface that was subjected to pickling has surface roughness. The surface roughness preferably has an arithmetic mean roughness Ra of 1 to 8 μm and a sampling length of 2.5 mm. When the arithmetic mean roughness Ra is not less than 1 μm, the lubricant coating layer 21 exhibits further enhanced adhesion properties. When the arithmetic mean roughness Ra is not greater than 8 μm, friction is inhibited and therefore damage and delamination of the lubricant coating layer 21 is inhibited.

The arithmetic mean roughness Ra referred to in the present description is measured based on JIS B 0601 (2001). For example, the arithmetic mean roughness Ra can be measured using a scanning probe microscope (SPI 3800N, manufactured by SII NanoTechnology Inc.). The measurement conditions are, for example, the number of acquired data points of 1024×1024 in sample regions of 2 μm×2 μm as a unit of acquired data. The sampling length is 2.5 mm. The greater the arithmetic mean roughness Ra is, the more the contact area with the lubricant coating layer 21 increases. Therefore, the adhesion properties with respect to the lubricant coating layer 21 increase by an anchoring effect. When the adhesion properties of the lubricant coating layer 21 increase, the threaded connection 1 for pipes or tubes exhibits further increased galling resistance.

[Base Metal of Threaded Connection 1 for Pipes or Tubes]

The composition of the base metal of the threaded connection 1 for pipes or tubes is not particularly limited. Examples of the base metal include carbon steels, stainless steels and alloy steels. Among alloy steels, high alloy steels such as duplex stainless steels that contain alloying elements such as Cr, Ni and Mo and an Ni alloy have high corrosion resistance. Therefore by using these high alloy steels as a base metal, excellent corrosion resistance is obtained in a corrosive environment that contains hydrogen sulfide or carbon dioxide or the like.

[Production Method]

Hereinafter, a method according to the present embodiment for producing the threaded connection 1 for pipes or tubes will be described.

A method for producing the threaded connection 1 for pipes or tubes according to the present embodiment includes a lubricant coating layer formation step of forming the lubricant coating layer 21 using the composition of the present embodiment on at least one of the contact surfaces of the pin 5 and the box 8.

[Lubricant Coating Layer Formation Step]

In the lubricant coating layer formation step, a mixture of the constituent components of the composition described above is liquified by solvent addition and/or heating, and the liquid mixture is applied onto at least one of the contact surfaces of the pin 5 and the box 8. The composition that was applied onto the contact surface is dried as necessary, to thereby form the lubricant coating layer 21. There are no restrictions regarding the states of the lubricant coating layer 21. The states of the lubricant coating layer 21 include, for example, solid, viscous liquid or semisolid.

Firstly, the composition is prepared. The composition of a solventless type may be prepared, for example, by heating a mixture of the constituent components of the aforementioned composition to a molten state, and kneading them. The composition may be made of a powder mixture prepared by mixing all the components in powder form.

The composition of a solvent type may be prepared, for example, by dissolving or dispersing the $Cr_2O_3$, the metal soap, the wax and the basic metal salt of an aromatic organic acid in a volatile organic solvent and mixing them.

For the composition of a solventless type, a hot melt process may be employed to apply the composition. In the hot melt process, the composition is heated to melt to a fluid state with low viscosity. The composition in a fluid state can be sprayed from a spray gun having functions for temperature holding. The composition is heated and melted within a tank including a suitable stirring mechanism, is supplied via a metering pump to the spray head (held at a predetermined temperature) of the spray gun by a compressor, and is sprayed. The heating temperature is, for example, in a range of 90 to 130° C. The holding temperatures for the tank interior and the spray head are adjusted in accordance with the melting point in the composition. Another application method, such as brushing or dipping, may be employed in place of spray coating. The temperature to which the composition is heated is preferably higher than the melting point of the composition by 10 to 50° C. Prior to application of the composition, at least one contact surface, to which the composition is to be applied, of the pin 5 or of the box 8, is preferably heated to a temperature higher than the melting point of the base material. This makes it possible to achieve good coating properties.

In the case of the composition of a solvent type, the composition in solution form is applied to the contact surface by spray coating or by another method. In this case, the viscosity of the composition is to be adjusted so that it can be applied by spraying in an environment at normal temperature and pressure.

In the case of the composition of a solventless type, the lubricant coating layer 21 is formed by cooling the composition applied to the contact surface to allow the composition in a molten state to dry. The cooling process can be carried out by a method known in the art. Examples of the cooling process include natural cooling and air cooling.

In the case of the composition of a solvent type, the lubricant coating layer 21 is formed by drying the composition applied to the contact surface. The drying process can be carried out by a method known in the art. Examples of the drying process include natural drying, low-temperature air drying, and vacuum drying.

The cooling may be carried out by rapid cooling using, for example, a nitrogen gas cooling system or a carbon dioxide cooling system. In the case where rapid cooling is performed, the cooling is carried out in an indirect manner at the opposite surface to the contact surface (in the case of the box 8, at the outer surface of the steel pipe 2 or the coupling 3, and in the case of the pin 5, at the inner surface of the steel pipe 2). This inhibits degradation of the lubricant coating layer 21 that may be caused by rapid cooling.

Preferably, the lubricant coating layer 21 covers all of at least one of the contact surfaces of the pin 5 and the box 8. The lubricant coating layer 21 may cover only part of the contact surfaces (e.g., only the metal seal portions 10 and 13).

The lubricant coating layer 21 may be formed of a single layer or multiple layers. The term "multiple layers" refers to two or more layers of the lubricant coating layer 21 deposited in sequence from the contact surface side. The two or more layers of the lubricant coating layer 21 can be formed by repeating the application and drying of the composition. The lubricant coating layer 21 may be formed directly on the contact surface or may be formed after a surface preparation treatment(s) described below is performed on the contact surface.

The thickness of the lubricant coating layer 21 is preferably 10 to 40 µm. When the thickness of the lubricant coating layer 21 is 10 µm or more, a high lubricity can be stably obtained. On the other hand, when the thickness of the lubricant coating layer 21 is not more than 40 µm, the adhesion properties of the lubricant coating layer 21 are stable. Furthermore, when the thickness of the lubricant coating layer 21 is not more than 40 µm, because the thread tolerance (clearance) of the sliding surfaces widens, interfacial pressure during sliding becomes lower. Therefore, the fastening torque can be inhibited from becoming excessively high. Accordingly, the thickness of the lubricant coating layer 21 is preferably 10 to 40 µm.

The thickness of the lubricant coating layer 21 is measured by the following method. The lubricant coating layer is applied onto a flat plate under the same conditions as those for applying the lubricant coating layer 21 onto the threaded connection 1 for pipes or tubes. Among the conditions for the application onto the threaded connection 1 for pipes or tubes and the flat plate, conditions such as the following are to be matched: the distance between the object to be coated and the tip of the nozzle, the spray pressure, the viscosity of the composition, and the rotational speed of the object to be coated. To match the respective viscosities of the composition, the temperatures of the tank, tube, and nozzle head are to be matched between the threaded connection 1 for pipes or tubes and the flat plate. The amount of the composition applied per unit time is calculated from the difference between the weight of the flat plate before application of the composition and the weight of the flat plate after application of the composition. The composition is dried on the flat plate to form the lubricant coating layer 21. The thickness of the lubricant coating layer 21 is measured using a thickness meter. The weight of the lubricant coating layer 21 is calculated from the difference between the weight of the flat plate before application of the composition and the weight of the flat plate after formation of the lubricant coating layer 21. The density of the lubricant coating layer 21 is calculated from the thickness and weight of the lubricant coating layer 21. Next, the area to be coated on the threaded connection 1 for pipes or tubes is calculated based on the thread shape and dimensions (inside diameter, wall thickness, etc.). The area to be coated corresponds to the area of the threaded surface with recesses and projections when it is supposed that the threaded surface is unfolded to a flat configuration. The average thickness of the lubricant coating layer 21 over the threaded connection 1 for pipes or tubes is calculated based on the time period of application of the composition to the threaded connection 1 for pipes or tubes, the area to be coated, and the density of the lubricant coating layer 21.

[Metal Plating Layer Formation Step]

The method for producing the threaded connection 1 for pipes or tubes according to the present embodiment may include a metal plating layer formation step before the lubricant coating layer formation step. Metal plating layer can be formed, for example, by electroplating treatment or impact plating treatment.

[Electroplating Treatment]

The electroplating treatment is, for example, a treatment that forms a metal plating layer by electroplating. The metal plating layer is, for example, a Zn alloy plating layer. In the case of forming a Zn alloy plating layer, in the electroplating treatment, the Zn alloy plating layer may be formed by an electroplating treatment on at least one of the contact surfaces of the pin 5 and the box 8.

Alternatively, in the electroplating treatment, a Zn alloy plating layer may be formed by an electroplating treatment on surface roughness formed on at least one of the contact surfaces of the pin 5 and the box 8.

By performing the electroplating treatment, the galling resistance and corrosion resistance of the threaded connection 1 for pipes or tubes are increased. In the case of forming a Zn alloy plating layer, examples of the electroplating treatment step include a treatment of applying a single layer of plating that includes Cu, Sn, or Ni metal, a treatment of applying a single layer of plating that includes a Cu—Sn alloy, a treatment of applying a two-layer plating including a Cu layer and an Sn layer, and a treatment of applying a three-layer plating including an Ni layer, a Cu layer and an Sn layer. For the steel pipe 2 formed from a steel having a Cr content of 5% or greater, preferred treatments are a Cu—Sn alloy plating treatment, a two-layer plating treatment in which a Cu plating and a Sn plating are applied, and a three-layer plating treatment in which an Ni plating, a Cu plating, and a Sn plating are applied. More preferred treatments are a two-layer plating treatment in which a Cu plating and an Sn plating are applied, a Zn—Co alloy plating treatment, a Cu—Sn—Zn alloy plating treatment, and a Zn—Ni alloy plating treatment.

The electroplating treatment can be carried out by a method known in the art. For example, a plating bath including ions of the metal elements to be contained in the alloy plating layer is prepared. Next, at least one of the contact surfaces of the pin 5 and the box 8 is immersed in the plating bath. By current conduction through the contact surface, an alloy plating layer is formed on the contact surface. The treatment conditions including the temperature of the plating bath and the duration of the plating treatment may be set appropriately.

More specifically, for example, in the case of forming a Cu—Sn—Zn alloy plating layer, the plating bath contains copper ions, tin ions and zinc ions. The composition of the plating bath is preferably Cu: 1 to 50 g/L, Sn: 1 to 50 g/L and Zn: 1 to 50 g/L. The electroplating conditions are, for example, a plating bath pH of 1 to 10, a plating bath temperature of 60° C., a current density of 1 to 100 A/dm$^2$ and a treatment time of 0.1 to 30 minutes.

In the case of forming a Zn—Ni alloy plating layer, the plating bath contains zinc ions and nickel ions. The composition of the plating bath is preferably Zn: 1 to 100 g/L and Ni: 1 to 50 g/L. The electroplating conditions are, for example, a plating bath pH of 1 to 10, a plating bath temperature of 60° C., a current density of 1 to 100 A/dm$^2$ and a treatment time of 0.1 to 30 minutes.

[Impact Plating Treatment]

An impact plating treatment is a treatment that can be performed by mechanical plating in which particles are allowed to collide with a material to be plated inside a rotating barrel, or by projection plating in which particles are caused to collide against a material to be plated using a blasting apparatus.

In the method for producing the threaded connection 1 for pipes or tubes according to the present embodiment, a blasting treatment or pickling may be performed with respect to a surface that contacts the lubricant coating layer 21. Surface roughness can be formed by the blasting treatment or pickling.

[Blasting Treatment]

The blasting treatment is, for example, a treatment in which particles are caused to collide against a material to be plated using a blasting apparatus. The blasting treatment is, for example, a sand blasting treatment. The sand blasting treatment is a treatment in which a blast material (abrasive) is mixed with compressed air and the mixture is propelled onto the contact surface. Examples of the blast material include spherical shot material and angular grit material. The sand blasting treatment increases the surface roughness of the contact surface. The sand blasting treatment may be carried out by a method known in the art. For example, air is compressed by a compressor and a blast material is mixed with the compressed air. The blast material may be made of, for example, stainless steel, aluminum, ceramic, or alumina. The sand blasting treatment conditions such as propelling speed may be set appropriately.

[Pickling Treatment]

The pickling treatment is a treatment in which the contact surface is immersed and roughened in a solution of a strong acid such as sulfuric acid, hydrochloric acid, nitric acid, or hydrofluoric acid. This increases the surface roughness of the contact surface. The pickling treatment is, for example, a chemical conversion treatment.

[Chemical Conversion Treatment Step]

The method for producing the threaded connection 1 for pipes or tubes according to the present embodiment may also include a chemical conversion treatment step before the lubricant coating layer formation step. In the chemical conversion treatment step, a chemical conversion treatment is performed to form, below the lubricant coating layer 21, a chemical conversion treatment coating having a surface that contacts the lubricant coating layer 21.

The chemical conversion treatment is a treatment in which a porous chemical conversion coating having a high surface roughness is formed. Examples of the chemical conversion treatment include phosphate chemical conversion treatments, oxalate chemical conversion treatment, and borate chemical conversion treatment. From the standpoint of adhesion properties of the lubricant coating layer 21, a phosphate chemical conversion treatment is preferred. The phosphate chemical conversion treatment is, for example, a phosphate chemical conversion treatment using manganese phosphate, zinc phosphate, manganese iron phosphate, or calcium zinc phosphate.

The phosphate chemical conversion treatment can be carried out by a method known in the art. The treatment solution may be a common acidic solution for phosphate chemical conversion treatment for zinc-plated products. An example of the solution is a solution for zinc phosphate chemical conversion treatment containing 1 to 150 g/L of phosphate ions, 3 to 70 g/L of zinc ions, 1 to 100 g/L of nitrate ions, and 0 to 30 g/L of nickel ions. Solutions for manganese phosphate chemical conversion treatments, which are conventionally used for threaded connection 1 for pipes or tubes, may also be used. The temperature of the solution is in the range of room temperature to 100° C., for example. The treatment time may be set depending on the desired thickness of the coating and, for example, may be 15 minutes. To facilitate the formation of the chemical conversion coating, surface modification may be performed prior to the phosphate chemical conversion treatment. The surface modification refers to the treatment including immersion in a surface modification aqueous solution containing colloidal titanium. After the phosphate chemical conversion treatment, it is preferred that rinsing with water or with warm water is carried out before drying.

Before the formation of the lubricant coating layer described above, only one type of treatment may be performed or a plurality of the treatments may be performed in combination.

Before the formation of the lubricant coating layer, the treatments performed for the pin 5 and the box 8 may be the same, or the treatments performed for the pin 5 and the box 8 may be different.

EXAMPLE

An example of the present invention will be described below. It should be noted that the present invention is not limited to the example. In the example, the contact surface of the pin is referred to as the pin surface and the contact surface of the box is referred to as the box surface. Unless otherwise specified, percent in the example means mass percent.

In the present example, VAM21 (registered trademark) manufactured by NIPPON STEEL & SUMITOMO METAL CORPORATION were used. VAM21 (registered trademark) is a threaded connection for pipes or tubes having an outside diameter of 177.80 mm (7 inches) and a wall thickness of 11.506 mm (0.453 inches). The steel grade was carbon steel. The carbon steel had a composition, C: 0.24%, Si: 0.23%, Mn: 0.7%, P: 0.02%, S: 0.01%, Cu: 0.04%, Ni: 0.05%, Cr: 0.95%, Mo: 0.15%, and the balance: Fe and impurities.

Surface preparation treatments were performed on the pin surface and the box surface of the respective test numbers as shown in Table 1. The numbers in the "Surface Preparation Treatment" column in Table 1 show the order in which the surface preparation treatment was performed. For example, in the case of "1. Finish grinding, 2. Zinc phosphate", finish grinding was performed, and thereafter a zinc phosphate chemical conversion treatment was performed. In the sand blasting process, abrasive grain of 100 mesh was used and surface roughness was formed. The arithmetic mean roughness Ra for each test number was as shown in Table 1. The arithmetic mean roughness Ra was measured based on JIS B 0601 (2013). Measurement of the arithmetic mean roughness Ra was performed using a scanning probe microscope (SPI 3800N, manufactured by SII NanoTechnology Inc.). The measurement conditions were the number of acquired data points of 1024×1024 in sample regions of 2 μm×2 μm as a unit of acquired data. The thickness of the Zn—Ni alloy coating was measured by the aforementioned measurement method.

TABLE 1

| Test No. | Pin Surface Preparation Treatment | Pin Arithmetic Mean Roughness Ra (μm) | Box Surface Preparation Treatment | Box Arithmetic Mean Roughness Ra (μm) |
|---|---|---|---|---|
| 1 | 1. Finish grinding | 0.3 | 1. Finish grinding | 0.3 |
| 2 | 1. Finish grinding | 0.3 | 1. Finish grinding | 0.3 |
|   | 2. Zinc phosphate | 1.0 | 2. Manganese phosphate | 1.2 |
| 3 | 1. Finish grinding | 0.3 | 1. Finish grinding | 0.3 |
|   | 2. Zinc phosphate | 1.0 | 2. Manganese phosphate | 1.2 |
| 4 | 1. Finish grinding | 0.3 | 1. Finish grinding | 0.3 |
|   | 2. Zinc phosphate | 1.0 | 2. Manganese phosphate | 1.2 |
| 5 | 1. Finish grinding | 0.3 | 1. Finish grinding | 0.3 |
|   | 2. Zinc phosphate | 1.0 | 2. Zn—Ni plating (coating thickness 8.0 μm) | 0.5 |
| 6 | 1. Finish grinding | 0.3 | 1. Finish grinding | 0.3 |
|   | 2. Sand blasting | 1.8 | 2. Sand blasting | 1.8 |
| 7 | 1. Finish grinding | 0.3 | 1. Finish grinding | 0.3 |
|   | 2. Sand blasting | 1.8 | 2. Sand blasting | 1.8 |
| 8 | 1. Finish grinding | 0.3 | 1. Finish grinding | 0.3 |
|   | 2. Zinc phosphate | 1.0 | 2. Manganese phosphate | 1.2 |
| 9 | 1. Finish grinding | 0.3 | 1. Finish grinding | 0.3 |
|   | 2. Zinc phosphate | 1.0 | 2. Manganese phosphate | 1.3 |
| 10 | 1. Finish grinding | 0.3 | 1. Finish grinding | 0.3 |
|   | 2. Zinc phosphate | 1.0 | 2. Manganese phosphate | 1.3 |

Thereafter, lubricant coating layers were formed using the respective compositions having the chemical compositions shown in Table 2, and a pin and a box were prepared for each test number. The content in mass percent that is based on the total amount of the non-volatile components of the composition is shown in brackets in the column for "Non-volatile Components Composition of Composition" in Table 2. A product with the product name "Green F3" manufactured by Nippon Chemical Industrial Co., Ltd. was used as the $Cr_2O_3$. Ca-stearate manufactured by DIC Corporation was used as the metal soap. Paraffin Wax manufactured by Nippon Seiro Co., Ltd. was used as the wax. As a basic metal salt of an aromatic organic acid, Calcinate (registered trademark) C400CLR (base number: 400 mg KOH/g) manufactured by Chemtura Corporation was used as a basic Ca sulfonate. In the case of using graphite as a lubricant powder, a graphite powder "Blue P" (trade name) (ash content: 3.79%, crystallinity: 96.9%, average particle size: 7 μm) manufactured by Nippon Graphite Industries, Ltd. was used. In the case of using PTFE as a lubricant powder, Lubron (registered trademark) L-5F manufactured by Daikin Industries, Ltd. was used. As a volatile organic solvent, a solvent with the product name Exxsol (registered trademark) D40 manufactured by ExxonMobil Chemical Company was used. Note that, in Test No. 8, a compound grease defined in API standard BUL 5A2 was used instead of a composition for forming a lubricant coating layer. Although the compound grease contained heavy metals such as lead and is harmful to humans and the environment, the lubricity thereof is favorable, and therefore the compound grease was adopted as a reference for evaluating over-torque performance that is described later.

TABLE 2

| Test No. | Non-volatile Components Composition of Composition (numerical value in parentheses shows the content in mass %) | | | | | Organic solvent (per 100 parts of total amount of non-volatile components) | Application method |
|---|---|---|---|---|---|---|---|
| | $Cr_2O_3$ | Metal soap | Wax | Basic metal salt of aromatic organic acid | Lubricant powder | | |
| 1 | (1) | Stearate Ca (19) | Paraffin wax (20) | Basic Ca sulfonate (60) | None | 30 parts | Normal temperature spraying |
| 2 | (5) | Stearate Ca (10) | Paraffin wax (15) | Basic Ca sulfonate (70) | None | 30 parts | Normal temperature spraying |
| 3 | (10) | Stearate Ca (15) | Paraffin wax (10) | Basic Ca sulfonate (65) | None | 30 parts | Normal temperature spraying |
| 4 | (20) | Stearate Ca (4) | Paraffin wax (5) | Basic Ca sulfonate (71) | None | 30 parts | Normal temperature spraying |
| 5 | (15) | Stearate Ca (17) | Paraffin wax (15) | Basic Ca phenate (48) | Graphite (5) | None | Heat spraying |
| 6 | (10) | Stearate Ca (10) | Paraffin wax (10) | Basic Ca salicylate (60) | PTFE (10) | 30 parts | Normal temperature spraying |
| 7 | (25) | Stearate Ca (10) | Paraffin wax (10) | Basic Ca salicylate (45) | PTFE (10) | 30 parts | Normal temperature spraying |

TABLE 2-continued

| Test No. | Cr$_2$O$_3$ | Metal soap | Wax | Basic metal salt of aromatic organic acid | Lubricant powder | Organic solvent (per 100 parts of total amount of non-volatile components) | Application method |
|---|---|---|---|---|---|---|---|
| 8 | Compound grease defined in API Standard BUL 5A2 | | | | | | Brush |
| 9 | None | Stearate Ca (15) | Paraffin wax (10) | Basic Ca sulfonate (75) | None | 30 parts | Normal temperature spraying |
| 10 | CaF$_2$ (10) | Stearate Ca (10) | Paraffin wax (10) | Basic Ca sulfonate (60) | PTFE (10) | 30 parts | Normal temperature spraying |

[Test No. 1]

In Test No. 1, finish machine grinding was performed on the pin surface and the box surface. Thereafter, a composition for forming a lubricant coating layer was applied onto the pin surface and the box surface by spraying at normal temperature (approximately 20° C.) to form lubricant coating layers. With regard to the coating thickness, a target average coating thickness was calculated using the weight and specific gravity of the composition to be applied per unit area and unit time based on a predetermined spraying pressure and a distance to the target surface, and application was performed so that the value thereof was in the range of 120 to 150 μm.

[Test No. 2 to Test No. 4]

In Test No. 2 to Test No. 4, finish machine grinding was performed on the pin surface and the box surface. The pin surface was immersed in a solution for zinc phosphate chemical conversion treatment at 75 to 85° C. for 10 minutes to form a zinc phosphate coating having a thickness of 10 μm. The box surface was immersed in a solution for manganese phosphate chemical conversion treatment at 80 to 95° C. for 10 minutes to form a manganese phosphate coating having a thickness of 12 μm. Thereafter, a composition for forming a lubricant coating layer was applied onto the pin surface and the box surface by spraying at normal temperature (approximately 20° C.) to form lubricant coating layers. With regard to the coating thickness, a target average coating thickness was calculated using the weight and specific gravity of the composition to be applied per unit area and unit time based on a predetermined spraying pressure and the distance to the target surface, and application was performed so that the value thereof was in the range of 120 to 150 μm.

[Test No. 5]

In Test No. 5, finish machine grinding was performed on the pin surface. The pin surface was immersed in a solution for zinc phosphate chemical conversion treatment at 75 to 85° C. for 10 minutes to form a zinc phosphate coating having a thickness of 10 μm. Thereafter, a lubricant coating layer was formed thereon by applying a composition for forming a lubricant coating layer onto the zinc phosphate coating by spraying at normal temperature (approximately 20° C.). With regard to the coating thickness, a target average coating thickness was calculated using the weight and specific gravity of the composition to be applied per unit area and unit time based on a predetermined spraying pressure and a distance to the target surface, and application was performed so that the value thereof was in the range of 120 to 150 μm.

Finish machine grinding was performed on the box surface. Thereafter, Zn—Ni alloy plating was performed by electroplating to form a Zn—Ni alloy plating layer on the box surface. The Zn—Ni alloy plating bath used was DAIN Zinalloy N-PL (trade name) manufactured by Daiwa Fine Chemicals Co., Ltd. The electroplating was performed under conditions of a plating bath pH of 6.5, a plating bath temperature of 25° C., a current density of 2 A/dm$^2$, and a treatment time of 18 minutes. The Zn—Ni alloy plating layer had a composition of Zn: 85% and Ni: 15%. A lubricant coating layer was formed thereon by application of a composition for forming a lubricant coating layer by heated (approximately 110° C.) spray application and slow cooling. With regard to the coating thickness, a target average coating thickness was calculated using the weight and specific gravity of the composition to be applied per unit area and unit time based on a predetermined spraying pressure and the distance to the target surface, and application was performed so that the value thereof was in the range of 120 to 150 μm.

[Test No. 6 and Test No. 7]

In Test No. 6 and Test No. 7, finish machine grinding was performed on the pin surface and the box surface. Thereafter, surface roughness was formed on the pin surface and the box surface by a blasting process. A composition for forming a lubricant coating layer was then applied onto the pin surface and the box surface by spraying at normal temperature (approximately 20° C.) to form lubricant coating layers. With regard to the coating thickness, a target average coating thickness was calculated using the weight and specific gravity of the composition to be applied per unit area and unit time based on a predetermined spraying pressure and the distance to the target surface, and application was performed so that the value thereof was in the range of 120 to 150 μm.

[Test No. 8]

In Test No. 8, finish machine grinding was performed on the pin surface and the box surface. The pin surface was immersed in a solution for zinc phosphate chemical conversion treatment at 75 to 85° C. for 10 minutes to form a zinc phosphate coating having a thickness of 10 μm. The box surface was immersed in a solution for manganese phosphate chemical conversion treatment at 80 to 95° C. for 10 minutes to form a manganese phosphate coating having a thickness of 12 μm. Thereafter, a dope according to the API standards was applied to the pin surface and the box surface by brushing. The term "dope according to the API standards" refers to compound grease for threaded connection for oil country tubular goods that is manufactured in accordance with API BUL 5A2. It is defined that the composition of the dope according to the API standards adopts grease as a base material, and contains graphite powder: 18±1.0%, lead powder: 30.5±0.6%, and copper flake: 3.3±0.3%. Note that, it is understood that, within this component range, compound greases for threaded connection for oil country tubular goods have equivalent performance.

[Test No. 9]

In Test No. 9, finish machine grinding was performed on the pin surface and the box surface. The pin surface was immersed in a solution for zinc phosphate chemical conversion treatment at 75 to 85° C. for 10 minutes to form a zinc phosphate coating having a thickness of 10 μm. The box surface was immersed in a solution for manganese phosphate chemical conversion treatment at 80 to 95° C. for 10 minutes to form a manganese phosphate coating having a thickness of 12 μm. Thereafter, a composition for forming a lubricant coating layer was applied onto the pin surface and the box surface by spraying at normal temperature (approximately 20° C.) to form lubricant coating layers. With regard to the coating thickness, a target average coating thickness was calculated using the weight and specific gravity of the composition to be applied per unit area and unit time based on a predetermined spraying pressure and the distance to the target surface, and application was performed so that the value thereof was in the range of 120 to 150 μm. In Test No. 9, $Cr_2O_3$ was not contained in the composition.

[Test No. 10]

In Test No. 10, finish machine grinding was performed on the pin surface and the box surface. The pin surface was immersed in a solution for zinc phosphate chemical conversion treatment at 75 to 85° C. for 10 minutes to form a zinc phosphate coating having a thickness of 10 μm. The box surface was immersed in a solution for manganese phosphate chemical conversion treatment at 80 to 95° C. for 10 minutes to form a manganese phosphate coating having a thickness of 12 μm. Thereafter, a composition for forming a lubricant coating layer was applied onto the pin surface and the box surface by spraying at normal temperature (approximately 20° C.) to form lubricant coating layers. With regard to the coating thickness, a target average coating thickness was calculated using the weight and specific gravity of the composition to be applied per unit area and unit time based on a predetermined spraying pressure and the distance to the target surface, and application was performed so that the value thereof was in the range of 120 to 150 μm. In Test No. 10, $CaF_2$ was contained as a component in the composition instead of $Cr_2O_3$.

[Galling Resistance Evaluation Test]

Evaluation of the galling resistance was performed by means of a repeated fastening test. Using the pins and boxes of Test No. 1 to Test No. 10, fastening and loosening were repeated at room temperature (20° C.), and the galling resistance was evaluated. The fastening torque was set to 24350 N·m. Each time one cycle of fastening and loosening was completed, the pin surface and box surface were visually observed. The occurrence of galling on threaded portions and metal seal portions was examined by visual inspection. With respect to the metal seal portions, the test was ended upon the occurrence of galling. When the galling on the threaded portion was minor and was repairable by repairing by filing or the like, the galling flaws were repaired and the test was continued. The maximum number of times for repeating fastening was set as 15 times. The maximum number of times fastening was performed without either unrepairable galling occurring at a threaded portion or galling occurring at a metal seal portion was adopted as the evaluation index for galling resistance. The results are shown in the "Galling Resistance (number of times (turns) fastening could be performed without either unrepairable galling occurring at a threaded portion or galling occurring at a metal seal portion)" column in Table 3.

TABLE 3

| Test No. | Galling Resistance (number of times (turns) fastening could be performed without either unrepairable galling occurring at a threaded portion or galling occurring at a metal seal portion) | Over-torque Performance |
|---|---|---|
| 1 | 14 | 115 |
| 2 | 14 | 121 |
| 3 | 14 | 125 |
| 4 | 13 | 138 |
| 5 | 15 | 130 |
| 6 | 15 | 127 |
| 7 | 12 | 143 |
| 8 | 10 | 100 |
| 9 | 5 | 58 |
| 10 | 10 | 98 |

[Over-Torque Performance Test]

Figure 7:
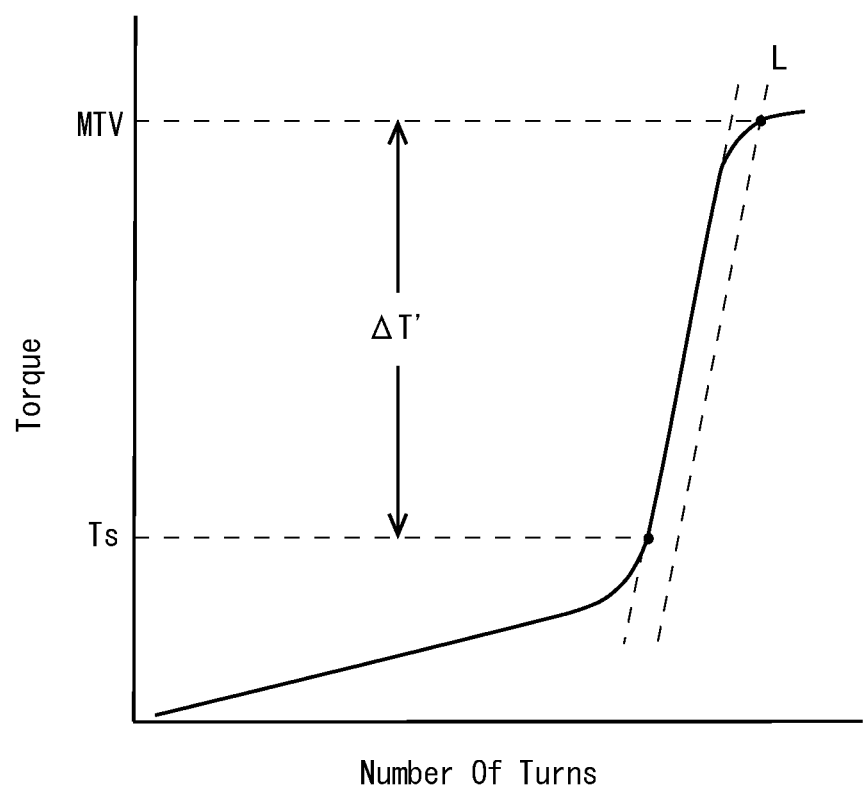
FIG. 7 is a graph for describing torque on shoulder resistance $\Delta T\square$ in an example.

Using the pins and boxes of Test No. 1 to Test No. 10, the torque on shoulder resistance $\Delta T\square$ was measured. Specifically, fastening was performed under conditions of a tightening speed of 10 rpm and a tightening torque of 42.8 kN·m. The torque at the time of fastening was measured, and a torque chart as illustrated in FIG. 7 was prepared. Reference characters "Ts" in FIG. 7 denote the shouldering torque. Reference characters "MTV" in FIG. 7 denote a torque value at which a line segment L and the torque chart intersect. The line segment L is a straight line that has the same slope as the slope of a linear region of the torque chart after shouldering, and for which the number of turns is 0.2% more in comparison to the aforementioned linear region. Normally, Ty (yield torque) is used when measuring the torque on shoulder resistance $\Delta T\square$. However, in the present example, the yield torque (boundary between a linear region and a non-linear region in the torque chart after shouldering) was indistinct. Therefore, MTV was defined using the line segment L. The difference between MTV and Ts was taken as the torque on shoulder resistance $\Delta T\square$ of the present example. The over-torque performance was determined as a relative value with respect to the torque on shoulder resistance $\Delta T\square$ of Test No. 8 where a dope according to the API standards was used instead of a lubricant coating layer as a reference (100). The results are shown in Table 3.

[Evaluation Results]

Referring to Table 1 to Table 3, the composition for forming a lubricant coating layer of the threaded connections for pipes or tubes of Test No. 1 to Test No. 7 had $Cr_2O_3$. Therefore, galling did not occur even when fastening and loosening were repeated 10 times, and thus excellent galling resistance was exhibited. Further, the over-torque performance was more than 100, and the threaded connections for pipes or tubes exhibited excellent over-torque performance.

In the threaded connections for pipes or tubes of Test No. 1 to Test No. 6, the content of $Cr_2O_3$ was 1 to 20.0%. Therefore, in the threaded connections for pipes or tubes of Test No. 1 to Test No. 6, the number of times fastening could be performed without galling was greater in comparison to the threaded connection for pipes or tubes of Test No. 7, and hence the galling resistance exhibited by the threaded connections for pipes or tubes of Test No. 1 to Test No. 6 was even more excellent than the galling resistance exhibited by the threaded connection for pipes or tubes of Test No. 7.

On the other hand, the composition for forming a lubricant coating layer of the threaded connection for pipes or tubes of Test No. 9 did not contain $Cr_2O_3$. Therefore, the galling resistance and the over-torque performance were low.

The composition for forming a lubricant coating layer of the threaded connection for pipes or tubes of Test No. 10 contained calcium fluoride $CaF_2$, and not $Cr_2O_3$. Therefore, the galling resistance and the over-torque performance were low.

An embodiment of the present invention has been described above. However, the foregoing embodiment is merely an example for implementing the present invention. Accordingly, the present invention is not limited to the above embodiment, and the above embodiment can be appropriately modified within a range which does not deviate from the gist of the present invention.

REFERENCE SIGNS LIST

1: Threaded connection for pipes or tubes
4: Male threaded portion
5: Pin
7: Female threaded portion
8: Box
10, 13: Metal seal portion
11, 12: Shoulder portion
21: Lubricant coating layer

The invention claimed is:

1. A composition for forming a lubricant coating layer on a threaded connection for pipes or tubes, the composition containing:
    $Cr_2O_3$,
    a metal soap,
    a wax, and
    a basic metal salt of an aromatic organic acid.

2. The composition according to claim 1, wherein:
    the composition contains, in mass percent based on a total amount of non-volatile components in the composition:
    $Cr_2O_3$: 1 to 20%,
    the metal soap: 2 to 30%,
    the wax: 2 to 30%, and
    the basic metal salt of an aromatic organic acid: 20 to 70%.

3. The composition according to claim 1, further containing:
    a lubricant powder.

4. The composition according to claim 2, further containing:
    a lubricant powder.

5. The composition according to claim 3, wherein:
    the composition contains, in mass percent based on a total amount of non-volatile components in the composition:
    the lubricant powder: 0.5 to 20%.

6. The composition according to claim 4, wherein:
    the composition contains, in mass percent based on a total amount of non-volatile components in the composition:
    the lubricant powder: 0.5 to 20%.

7. The composition according to claim 3, wherein:
    the lubricant powder is one or more types selected from a group consisting of graphite and polytetrafluoroethylene.

8. The composition according to claim 1, further containing:
    a volatile organic solvent.

9. A threaded connection for pipes or tubes that comprises a pin and a box, wherein:
    the pin and the box each include a contact surface having a threaded portion;
    the threaded connection for pipes or tubes comprising a lubricant coating layer formed from a composition according to claim 1 as an outermost layer that is formed on at least one of the contact surfaces of the pin and the box.

10. A threaded connection for pipes or tubes that comprises a pin and a box, wherein:
    the pin and the box each include a contact surface having a threaded portion;
    the threaded connection for pipes or tubes comprising a lubricant coating layer formed from a composition according to claim 2 as an outermost layer that is formed on at least one of the contact surfaces of the pin and the box.

11. A threaded connection for pipes or tubes that comprises a pin and a box, wherein:
    the pin and the box each include a contact surface having a threaded portion;
    the threaded connection for pipes or tubes comprising a lubricant coating layer formed from a composition according to claim 3 as an outermost layer that is formed on at least one of the contact surfaces of the pin and the box.

12. A threaded connection for pipes or tubes that comprises a pin and a box, wherein:
    the pin and the box each include a contact surface having a threaded portion;
    the threaded connection for pipes or tubes comprising a lubricant coating layer formed from a composition according to claim 4 as an outermost layer that is formed on at least one of the contact surfaces of the pin and the box.

13. A threaded connection for pipes or tubes that comprises a pin and a box, wherein:
    the pin and the box each include a contact surface having a threaded portion;
    the threaded connection for pipes or tubes comprising a lubricant coating layer formed from a composition according to claim 5 as an outermost layer that is formed on at least one of the contact surfaces of the pin and the box.

14. A threaded connection for pipes or tubes that comprises a pin and a box, wherein:
    the pin and the box each include a contact surface having a threaded portion;
    the threaded connection for pipes or tubes comprising a lubricant coating layer formed from a composition according to claim 6 as an outermost layer that is formed on at least one of the contact surfaces of the pin and the box.

15. A threaded connection for pipes or tubes that comprises a pin and a box, wherein:
    the pin and the box each include a contact surface having a threaded portion;
    the threaded connection for pipes or tubes comprising a lubricant coating layer formed from a composition according to claim 7 as an outermost layer that is formed on at least one of the contact surfaces of the pin and the box.

16. A threaded connection for pipes or tubes that comprises a pin and a box, wherein:
    the pin and the box each include a contact surface having a threaded portion;
    the threaded connection for pipes or tubes comprising a lubricant coating layer formed from a composition according to claim 8 as an outermost layer that is formed on at least one of the contact surfaces of the pin and the box.

17. The threaded connection for pipes or tubes according to claim 9, further comprising:
a metal plating layer between at least one of the contact surfaces of the pin and the box, and the lubricant coating layer.

18. The threaded connection for pipes or tubes according to claim 9, further comprising:
below the lubricant coating layer, a chemical conversion treatment coating having a surface that contacts the lubricant coating layer.

19. The threaded connection for pipes or tubes according to claim 9, wherein:
a surface that contacts the lubricant coating layer is subjected to a blasting treatment or to pickling.

20. The threaded connection for pipes or tubes according to claim 9, wherein:
the contact surface further includes an unthreaded metal contact portion.

\* \* \* \* \*

UNITED STATES PATENT AND TRADEMARK OFFICE
CERTIFICATE OF CORRECTION

PATENT NO. : 11,268,043 B2
APPLICATION NO. : 16/754897
DATED : March 8, 2022
INVENTOR(S) : Kunio Goto It is certified that error appears in the above-identified patent and that said Letters Patent is hereby corrected as shown below:

In the Specification

In Column 3, Line 45:
Please delete:
"$\Delta T_\square$"
And insert:
-- $\Delta T'$ --

In Column 4, Lines 19, 23, 25, 27, 34, 38, 41, 45, 52:
Please delete:
"$\Delta T_\square$"
And insert:
-- $\Delta T'$ --

In Column 24, Lines 22, 35, 40, 43:
Please delete:
"$\Delta T_\square$"
And insert:
-- $\Delta T'$ --

Signed and Sealed this
Seventh Day of June, 2022

Katherine Kelly Vidal
*Director of the United States Patent and Trademark Office*